United States Patent [19]
Fima et al.

[11] Patent Number: 5,567,879
[45] Date of Patent: Oct. 22, 1996

[54] MICROACCELEROMETER WITH TEMPERATURE-COMPENSATED RESONATORS

[75] Inventors: Henri Fima, Malissard; Christophe Legoux, Valence, both of France

[73] Assignee: Sextant Avionique, Cedex, France

[21] Appl. No.: 471,318

[22] Filed: May 19, 1995

[30] Foreign Application Priority Data

May 27, 1994 [FR] France .................................. 94 06726

[51] Int. Cl.$^6$ ...................................................... G01P 15/10
[52] U.S. Cl. ......................................... 73/514.29; 73/497
[58] Field of Search ............................... 73/497, 514.15, 73/514.36, 514.29, 514.16

[56] References Cited

U.S. PATENT DOCUMENTS 4,398,417  8/1983  Shutt ........................................... 73/497
5,005,413  4/1991  Novack et al. ........................ 73/514.29
5,186,053  2/1993  Egley et al. ............................... 73/497
5,261,277  11/1993  Thomas et al. ....................... 73/514.15

Primary Examiner—Hezron E. Williams
Assistant Examiner—Christine K. Oda
Attorney, Agent, or Firm—Lowe, Price, LeBlanc & Becker

[57] ABSTRACT

A resonator microaccelerometer sensitive to accelerations along a first direction is formed from a thin plate whose plane comprises the first direction and a second direction perpendicular to the first direction and that is orthogonal with a third direction. The microaccelerometer comprises a fixed frame; a seismic mass; two hanging legs; and two resonator beams. The hanging legs extend substantially along the second direction, each leg being directed toward the center of gravity of the mass, symmetrically with respect to this center; the resonator beams are parallel, but non collinear, and are symmetrical with respect to the center of gravity of the mass.

7 Claims, 4 Drawing Sheets

1

MICROACCELEROMETER WITH TEMPERATURE-COMPENSATED RESONATORS

BACKGROUND OF THE INVENTION

1. Field of the Invention

The present invention relates to microaccelerometers of the type formed from a plate of a material such as quartz or silicon etched so as to delineate a seismic mass maintained on a frame by hangers and connected to this frame by beams constituting resonators.

2. Discussion of the Related Art

Such a microaccelerometer is disclosed in U.S. Pat. No. 5,261,277 assigned to the applicant. The U.S. patent discloses a microaccelerometer constituted from a thin plate of a material such as silicon or quartz that is sandwiched between two plates constituting upper and lower covers, and the connection between a moving mass formed in the central plate and the frame of this central plate by hangers and by beams forming resonators. The resonators are capacitively coupled to metallizations formed on either one of the cover plates.

FIGS. 1A–1C schematically illustrate a structure of a moving mass M, hanging legs S1 and S2 and resonator beams R1 and R2. The structure is not identical to the structure of the above-mentioned U.S. patent and is simplified to emphasize the problem that the present invention aims to solve. The hanging legs S1 and S2 extend along an axis y and the resonator beams R1 and R2 extend along an axis x perpendicular to axis y. The legs S1 and S2 are designed in order to have a high rigidity along axis z perpendicular to plane x, y and to be very flexible along the axis direction x. Thus, when subjected to an acceleration oriented along axis x, the mass M can move slightly along this direction, which causes the resonating beam R1 to be expanded and the resonating beam R2 to be compressed. These stresses on the resonator beams modify their resonance frequencies, the frequency variation characterizing the acceleration.

FIG. 1B is a schematic cross-sectional view along line BB of FIG. 1A representing the assembly of an accelerometer plate according to the present invention. The seismic mass M is etched from an intermediate plate which comprises a frame 10 sandwiched between two plates forming the protection cover plates 11 and 12. Plate 11 comprises electrical conductors arranged so as to excite and to detect the resonance of the resonators R1 and R2, which are metallized or conductive (refer to U.S. Pat. No. 5,261,277).

The effect of an inhomogeneous temperature inside the chamber accommodating the accelerometer will now be described with relation to FIG. 1C. More particularly, it is assumed that the resonator beam R1 is at a temperature higher by $\Delta T$ than the resonator beam R2. Then, the resonator beam R1 tends to extend and, in response to the reaction of the resonator beam R2, the beam R1 is subjected to compression like the beam R2. Thus, the seismic mass M is subjected to the force F generated by the expansion of beam R1, to the reaction force F' of beam R2 and to the return forces F1 and F2 of the hanging legs S1 and S2. It is clear that the torsion forces F1 and F2 are negligible as compared with the compression forces F and F'. Thus, by a first approximation, at equilibrium, F+F'=0.

Force F is expressed by:

$$F=E(\alpha L\Delta T-\Delta x)el/L,$$

2 where

E is the Young modulus, $\alpha$ is the expansion coefficient of the material of the resonator beams, l is the width of the resonator beams, $\Delta T$ is the difference of temperature, $\Delta x$ is the motion of the seismic mass M, e is the thickness of the resonator beams, and L is the length of the resonator beams.

Force F' is expressed by:

$$F'=-Eel/L\Delta x.$$

F+F'=0 leads to:

$$\Delta x=\alpha l\Delta T/2,$$

and $$F=Eel\alpha\Delta T/2$$

By examining the consequences of temperature variations on the resonance frequency f of the resonators, the equation for the first resonator is $$\delta f=KF,$$

and for the second resonator $$\delta f'=-K'F'=-K'F=-(K+\Delta K)F.$$

It is assumed above that the ratio between the frequency variation and the force is not strictly identical for the two resonators. Indeed, the structures of the two resonators are unavoidably dissimilar. This leads to $\Delta f-\delta f=\Delta KF$. In addition, it is known that $\delta f-\delta f'=KM\delta\gamma$, where M designates the mass of the seismic mass. Thus, the equivalent acceleration which is measured in the absence of acceleration is $\delta\gamma$, but when the temperature of one of the resonators differs from the other, the acceleration is $$\delta\gamma=(\Delta K/K)(F/M)\ (\Delta K/K)Eel\alpha\Delta T/2M. \qquad (1)$$

Consider an example in the case where the seismic mass and the resonators are made of silicon. Then $E=1.7\times10^{11}$ N/m², $\alpha=2.6\times10^{-6}/°C$. The case where $e=20$ μm, $l=60$ μm, $M=6.3\times10^{-6}$ kg, is also considered. Then, if $\Delta K/K$ is approximately 5% (which corresponds to usual fabrication allowances), one obtains for a variation $\Delta T=1/1000/°C$., $\delta\gamma=200$ μg (where g designates the gravity acceleration).

In practice, differences up to some hundredths of a degree between the resonator beams are far from being impossible. This leads to errors in the acceleration measurements of approximately 2 mg. Such errors are not negligible because an accelerometer of the considered type can be used to reach precisions better than 1 mg.

SUMMARY OF THE INVENTION

An object of the present invention is to provide a microaccelerometer of the above disclosed type which is insensitive to temperature gradients.

To achieve this object, the present invention modifies the structure of the microaccelerometer and more particularly the arrangement of its hanging legs and resonator beams so that the expansion due to temperature variations of one of the resonator beams does not cause compression of the two resonator beams.

More particularly, the present invention provides a resonator microaccelerometer which is sensitive to accelerations along a first direction. The microaccelerometer is formed from a thin plate whose plane comprises the first direction and a second direction perpendicular to the first one and that is orthogonal with a third direction. The microaccelerometer comprises a fixed frame; a seismic mass; two hanging legs between the frame and the mass, these legs being rigid along the third direction and flexible along the first direction; two resonator beams extending between the frame and the mass along the first direction. The hanging legs extend substantially along the second direction and each leg is directed toward the center of gravity of the mass, symmetrically with respect to this center; the resonator beams are parallel, but non collinear, and are symmetrical with respect to the center of gravity of the mass.

According to an embodiment of the invention, the hanging legs are collinear.

According to an embodiment of the invention, the thickness of the hanging legs is substantially the same as the thickness of the thin plate, and the resonator beams are much thinner than the thin plate.

According to an embodiment of the invention, the thin plate is a silicon plate.

According to an embodiment of the invention, the thin plate is a quartz plate.

The present invention further provides a process for fabricating a resonator microaccelerometer which is sensitive to accelerations along a first direction. The microaccelerometer is formed from a thin plate whose plane comprises the first direction and a second direction perpendicular to the first one and is orthogonal to a third direction. The microaccelerometer comprises a frame; a seismic mass; two hanging legs between the frame and the mass, these legs being rigid along the third direction and flexible along the first direction; and two resonator beams extending between the frame and the mass along the first direction. The thin plate is constituted by a sandwich comprising a first plate of a first material coated with a thin layer of a second material, and a thin layer of a third material. The mass and the frame are etched throughout the thin plate. The hanging legs are etched in the first plate. The the resonator beams are etched in the thin layer of the third material.

According to an embodiment of the invention, the first and third materials are silicon and the second material is silicon oxide.

The foregoing and other objects, features, aspects and advantages of the invention will become apparent from the following detailed description of the present invention when taken in conjunction with the accompanying drawings.

DETAILED DESCRIPTION

Figure 1A:
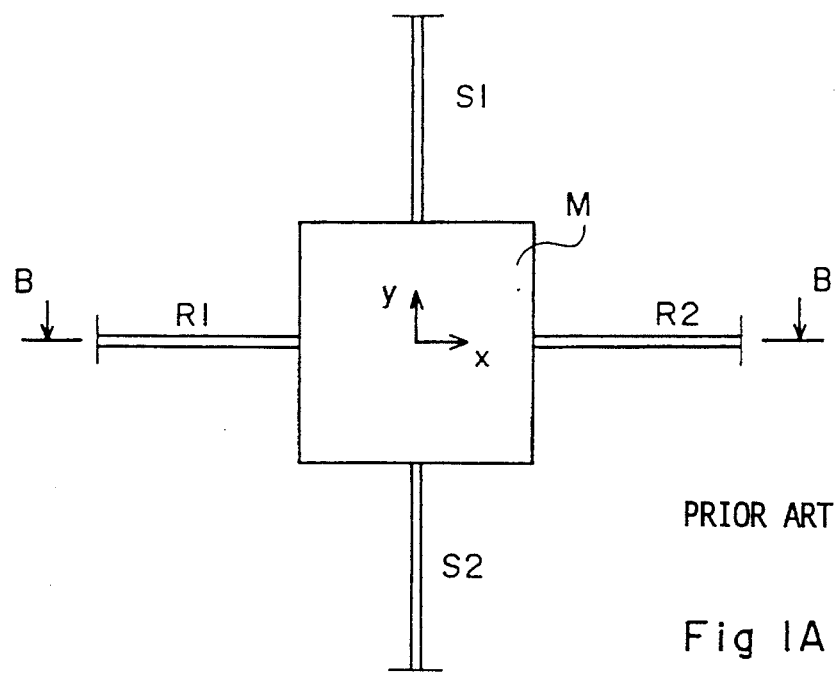
FIGS. 1A–1C, above described, illustrate the state of the art and the problem encountered.
Figure 1B:
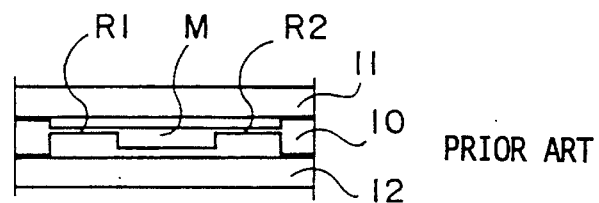
Figure 1C:
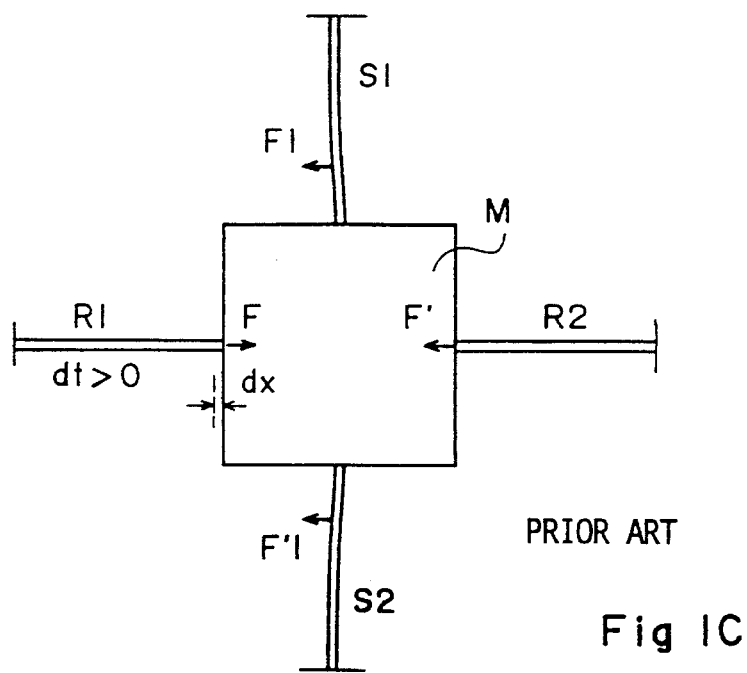
Figure 2A:
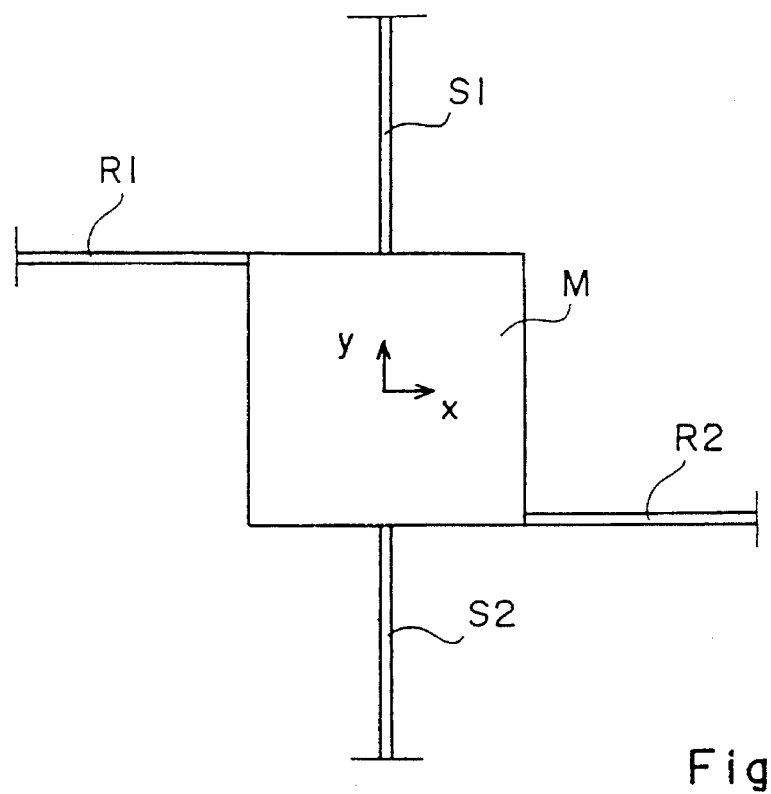
FIGS. 2A and 2B are schematic top views of a microaccelerometer according to the present invention.

As shown in FIG. 2A, according to an embodiment of the present invention, the seismic mass M is associated with two hanging legs S1 and S2 that are collinear and directed towards the center of rotation which corresponds to the center of gravity of the mass M. In contrast, the resonator beams R1 and R2, instead of being collinear and facing each other on both sides of the seismic mass, are still oriented along the direction of the detection axis x but are shifted one with respect to the other, symmetrically with respect to the center of gravity of the mass. Thus, in this structure, as in the prior art structure, any constraint of the mass M along direction x, due to acceleration, causes one of the resonator beams to be compressed and the other beam to be expanded, without causing rotation of the seismic mass. In contrast, an expansion of one of the resonators, for example of the resonator R1, due to temperature variations, causes, as schematically shown in the enlarged drawing in FIG. 2B, the rotation of the seismic mass and torsion forces of the hanging legs S1 and S2 and of the resonator beams R1 and R2, but no more a longitudinal compression force of the resonator beams R1 and R2. The deformations of the resonator beams R1 and R2 are exaggerated in FIG. 2A, and the main deformation forces are the torsion forces F1 and F2 of the hanging legs S1 and S2. Thus, the acceleration error can be expressed by the following equation:

$$M\delta\gamma = |\vec{F}1 + \vec{F}2| = (Ee'l^3/L^3)\alpha L\Delta T = (Ee'l^3/L^2)\alpha\Delta T. \qquad (2)$$

In equation (2), parameters e', l' and L correspond to the hanging legs and no longer, as in equation (1), to the resonator beams. In an example, L=3 mm, e'=0.3 mm and l'=20 μm. While keeping the above-mentioned values, for a temperature variation $\Delta T=10^{-3}/°C.$, an acceleration error of only 2 μg, i.e., 100 times lower than in the preceding case, is obtained.

Figure 2B:
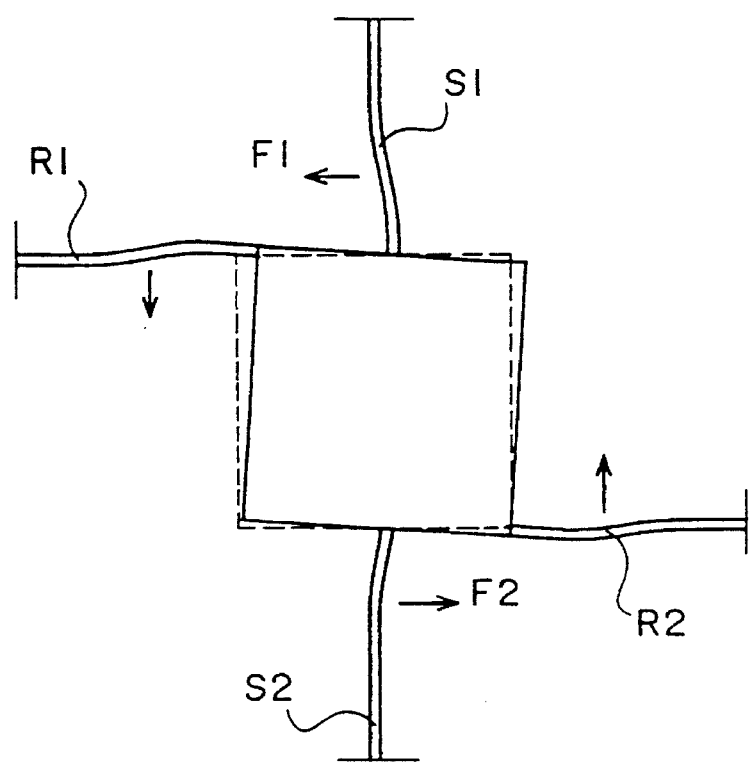

The structure of FIGS. 2A and 2B only constitutes an exemplary structure according to the invention. More generally, the present invention provides a structure such that the longitudinal efforts applied to the resonator beams R1 and R2 are transformed into rotation motions when one of the beams expands. For this purpose, according to the applicant's present recommendations, the following requirements should be complied with:

the compression axis of the resonator beams R1 and R2 should be shifted with respect to the center of gravity of the mass, the axis of the hanging legs S1 and S2 should cross the center of gravity of the mass so that a slight rotation of the mass about its center of gravity does not cause any change in the length of the hanging legs.

Figure 3A:
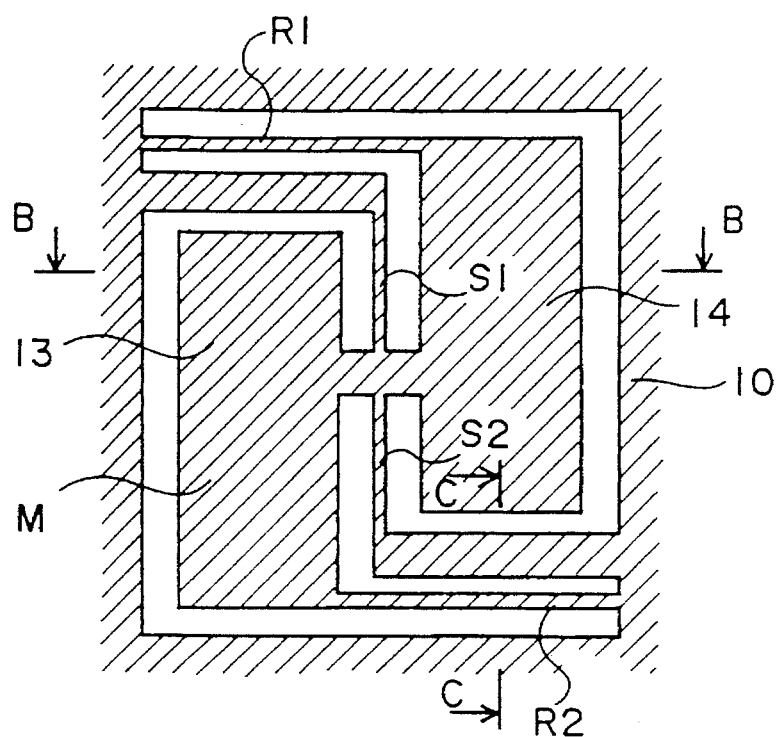
FIGS. 3A–3C are a top view and a cross-sectional view, respectively, of an embodiment of a microaccelerometer according to the invention.

FIG. 3A is a schematic top view of an alternative embodiment of the structure of FIG. 2A. The seismic mass M is roughly shaped like a H. The hanging legs S1 and S2 are collinear and substantially directed to the center of the H, parallel to the longer sides of the H. The resonators R1 and R2 are opposed and extend from each of the branches of the H. Each resonator and hanging leg is coupled to a peripheral portion of the plate in which the mass is formed. This peripheral portion, or frame, is designated by reference 10.

Figure 3B:
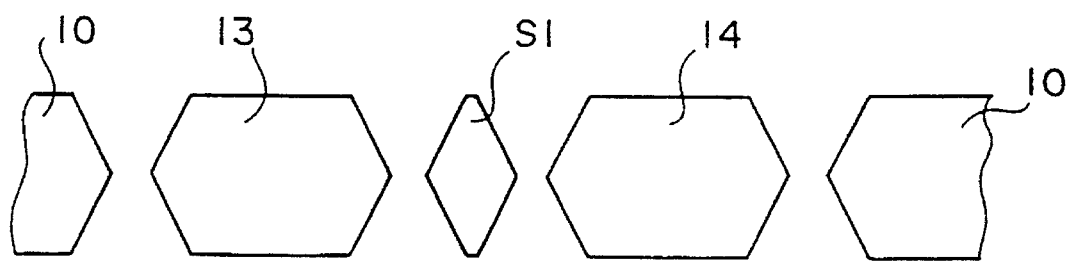

FIG. 3B is a cross-sectional view along line BB of FIG. 3A. This cross-sectional view will be better understood by referring to the above U.S. Pat. No. 5,261,277. It should be reminded that such a structure can be formed from a silicon or quartz plate. Preferably, a silicon plate is anisotropically etched to provide the structure illustrated in FIG. 3B, in which are shown from left to right: a frame 10, a branch 13 of the H of mass M, the hanging legs S1, a second branch 14 of the H, and again frame 10. This type of etching provides hanging legs that are very flexible along the lateral direction and very rigid along a direction perpendicular to the plane of the seismic mass.

Figure 3C:
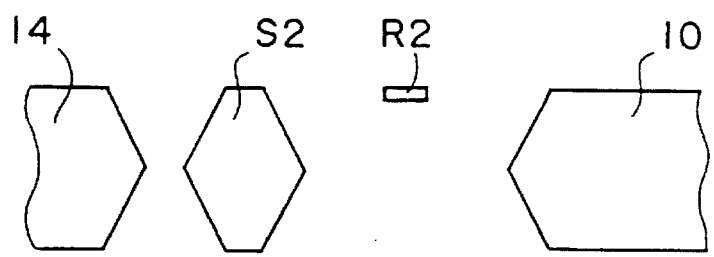

FIG. 3C is a cross-sectional view along line C—C of FIG. 3A, and shows a portion of the branch 14 of the H, the hanging leg S2 in a large section, i.e., in a portion where it has no flexibility, a portion of the resonator beam R2 and the frame 10. The above-mentioned U.S. patent more particularly discloses a process used to obtain portions with a shallow thickness corresponding to the resonator beams.

Figure 4A:
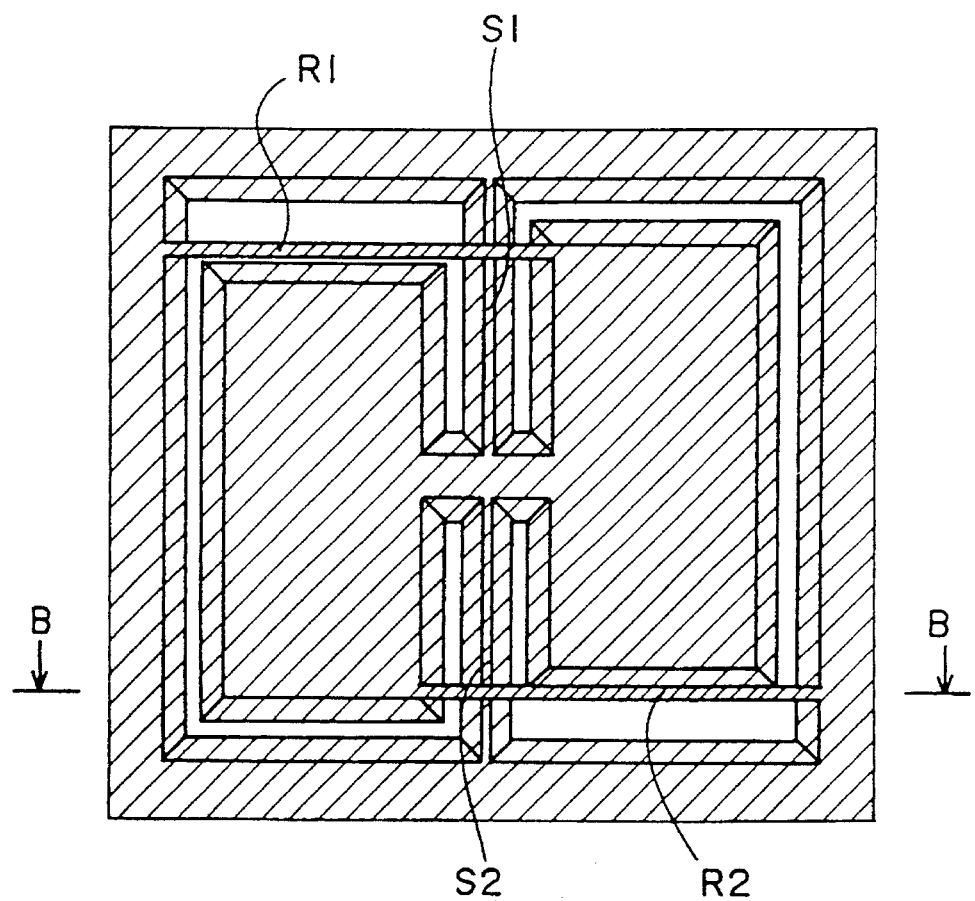
FIGS. 4A and 4B are a top view and a cross-sectional view, respectively, of another embodiment of a microaccelerometer according to the invention.
Figure 4B:
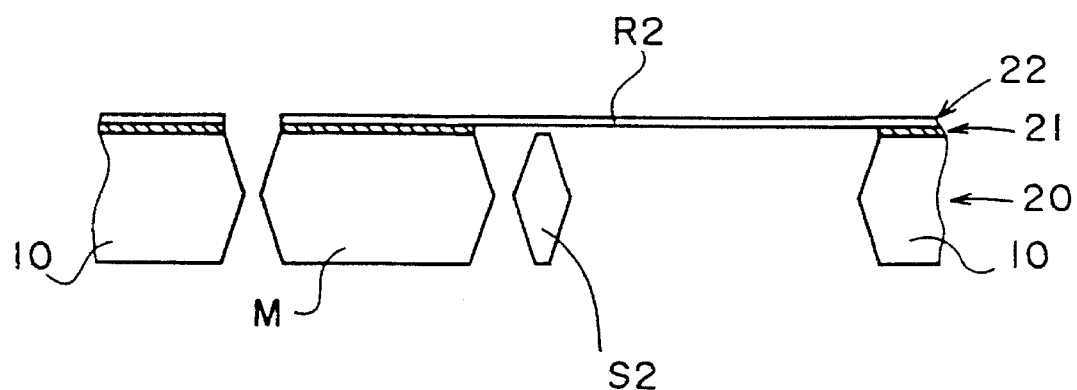

FIGS. 4A and 4B illustrate an alternative embodiment of the structure of FIG. 3A, whose fabrication mode constitutes an aspect of the present invention.

The general shape of the structure of FIG. 4A is the same as that of FIG. 3A. The main difference lies in that, instead of being etched from a plate made of a single material, such as a silicon plate or a quartz plate, the structure is etched from a plate made of a composite material comprising, for example, a silicon plate 20 coated with a thin silicon oxide layer 21, in turn coated with a thin layer 22 of silicon. Plate 20 can have the conventional thickness of a silicon wafer i.e., ranging from 0.3 mm to 0.5 mm, the silicon oxide layer 21 can have a thickness ranging from 2 µm to 10 µm, and the silicon layer 22 can have a thickness ranging from 2 µm to 5 µm.

As represented in the cross-sectional view 4B along line B—B of FIG. 4A, the thickness of the frame and seismic mass is substantially the same as the overall thickness of sandwich 20, 21, 22, whereas the hanging legs are defined only in plate 20 and the resonator beams are defined only in the thin layer 22.

As compared with the prior art embodiment, this process makes it possible to simplify etching of the resonators. Indeed, in the prior art embodiment, it was necessary to provide a deep etching extending, while maintaining a very shallow thickness of silicon. In the present case, the thickness of the resonator beams is defined by the thickness of the thin layer of silicon or other suitable material 22.

A further advantage of the embodiment of FIGS. 4A and 4B is that, as represented, it is possible to provide geometric structures in which the hanging legs and the resonator beams cross one another, whereby more compact structures can be provided.

As is apparent to those skilled in the art, various modifications can be made to the above disclosed preferred embodiments; in particular for the fabrication process and the specific structures allowing to compensate for dilatation according to the principles described in the present disclosure.

We claim:

1. A resonator microaccelerometer sensitive to accelerations along a first direction (x), formed from a thin plate whose plane comprises the first direction (x) and a second direction (y) perpendicular to the first direction and that is orthogonal with a third direction (z), comprising:

a fixed frame;

a seismic mass comprising a plate whose main plane comprises the first and second directions (x and y, respectively) and is movable laterally in its plane;

two hanging legs between the frame and the mass, said legs being rigid along the third direction and flexible along the first direction;

two resonator beams extending between the frame and the mass along the first direction;

wherein:

the hanging legs extend substantially along the second direction, each one of said legs being directed toward the center of gravity of the mass and extending symmetrically with respect to said center of gravity; and the resonator beams are parallel, but non collinear, and are symmetrical with respect to the center of gravity of the mass.

2. The microaccelerometer of claim 1, wherein the hanging legs are collinear.

3. The microaccelerometer of claim 1, wherein the thickness of the hanging legs is substantially the same as the thickness of the thin plate, and the resonator beams are much thinner than said thin plate.

4. The microaccelerometer of claim 3, wherein the thin plate is a silicon plate.

5. The microaccelerometer of claim 1, wherein the thin plate is a quartz plate.

6. A process for fabricating a resonator microaccelerometer sensitive to accelerations along a first direction (x), formed from a thin plate whose plane comprises the first direction (x) and a second direction (y) perpendicular to the first one and is orthogonal to a third direction (z), comprising:

a frame;

a seismic mass;

two hanging legs between the frame and the mass, said legs being rigid along the third direction and flexible along the first direction; and two resonator beams extending between the frame and the mass along the first direction;

wherein:

said thin plate is constituted by a sandwich comprising a first plate of a first material coated with a thin layer of a second material, and a thin layer of a third material;

the mass and the frame are etched throughout the thin plate;

the hanging legs are etched in the first plate; and the resonator beams are etched in the thin layer of the third material.

7. The process of claim 6, wherein the first and third materials are silicon and the second material is silicon oxide.

* * * * *